(12) United States Patent
Moyes

(10) Patent No.: US 10,893,723 B2
(45) Date of Patent: Jan. 19, 2021

(54) SIDE RELEASE BUCKLE DEVICE

(71) Applicant: Christine Moyes, Tallahassee, FL (US)

(72) Inventor: Christine Moyes, Tallahassee, FL (US)

(*) Notice: Subject to any disclaimer, the term of this patent is extended or adjusted under 35 U.S.C. 154(b) by 0 days.

(21) Appl. No.: 16/659,202

(22) Filed: Oct. 21, 2019

(65) Prior Publication Data
US 2020/0046083 A1 Feb. 13, 2020

Related U.S. Application Data

(63) Continuation-in-part of application No. 15/808,107, filed on Nov. 9, 2017, now Pat. No. 10,448,709.

(51) Int. Cl.
| | |
|---|---|
| *A44B 11/26* | (2006.01) |
| *F21V 33/00* | (2006.01) |
| *H04B 1/3827* | (2015.01) |
| *H04N 5/225* | (2006.01) |
| *A44B 11/00* | (2006.01) |
| *F21Y 115/10* | (2016.01) |
| *F21S 9/02* | (2006.01) |

(52) U.S. Cl.
CPC ............ *A44B 11/005* (2013.01); *A44B 11/26* (2013.01); *F21V 33/0004* (2013.01); *H04B 1/385* (2013.01); *H04N 5/2257* (2013.01); *F21S 9/02* (2013.01); *F21Y 2115/10* (2016.08)

(58) Field of Classification Search
CPC .......... F21S 9/02; A44B 11/005; A44B 11/26; F21V 33/0004; F21V 33/0008; F21V 33/0064; F21Y 2115/10; H04B 1/385; H04N 5/2257
See application file for complete search history.

(56) References Cited

U.S. PATENT DOCUMENTS

| | | | | |
|---|---|---|---|---|
| 3,381,268 A | * | 4/1968 | Boblitz | F02N 15/10 180/270 |
| 5,149,189 A | * | 9/1992 | Kawamura | A44B 11/2523 24/633 |
| 5,181,773 A | * | 1/1993 | Colvin | A44B 11/2565 280/801.1 |
| 6,965,231 B1 | * | 11/2005 | Cinoglu | A61B 5/0555 324/300 |
| 9,820,534 B1 | * | 11/2017 | Kelley | A44B 11/006 |

(Continued)

*Primary Examiner* — Robert Sandy
*Assistant Examiner* — David M Upchurch
(74) *Attorney, Agent, or Firm* — Adrienne Love

(57) ABSTRACT

A side release buckle device with a male and female member. The female member has a housing, a catch assembly, and at least one contact point. The male member can interlock with the female member and has an arm assembly, a catch assembly, and at least one contact point. At least one switch is formed by contact between contact point of the male member and contact point of the female member. An electrical circuit traverses the female and male member, so when the members are "locked" together, the switch is closed. The electrical circuit has a series of wires, a source of electrical energy, a currently limiting resistor, at least one switch, and an electrical element (at least one microcontroller or integrated circuit, a Bluetooth® RF transceiver, Wi-Fi® enablement). The device may have a computer chip activated upon closure of the switch, triggering activation of an external camera, or a GPS-tracking system. The device pairs with other communication devices.

18 Claims, 18 Drawing Sheets

(56) References Cited

U.S. PATENT DOCUMENTS

| | | | | |
|---|---|---|---|---|
| 2003/0209088 A1* | 11/2003 | Sullivan | .................. | B60R 22/48 |
| | | | | 73/862.391 |
| 2010/0013622 A1* | 1/2010 | Rumps | ................ | A44B 11/2565 |
| | | | | 340/457.1 |
| 2010/0244543 A1* | 9/2010 | Fine | ..................... | B60N 2/2812 |
| | | | | 297/484 |
| 2011/0232052 A1* | 9/2011 | Midorikawa | ...... | A44B 11/2523 |
| | | | | 24/640 |
| 2014/0052342 A1* | 2/2014 | Seibert | .................... | B60R 22/48 |
| | | | | 701/45 |
| 2014/0239853 A1* | 8/2014 | Woodham | .............. | H05B 47/10 |
| | | | | 315/362 |
| 2014/0304955 A1* | 10/2014 | Hortnagl | ............ | A44B 11/2573 |
| | | | | 24/595.1 |
| 2018/0078001 A1* | 3/2018 | Babin | ................ | A44B 11/2573 |

* cited by examiner

SIDE RELEASE BUCKLE DEVICE

CROSS-REFERENCES TO RELATED APPLICATIONS

This non-provisional patent application is a continuation-in-part of U.S. patent application Ser. No. 15/808,107 and thus claims the benefit of said earlier filed U.S. patent application. This application lists the same inventor as the parent application.

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to the field of devices made for a side release buckle device. More specifically, the invention comprises a side release buckle that acts as an electrical switch to power light emitting diodes (LED) and trigger other electrical events.

2. Description of the Related Art

Side release buckles 10 are clasps that have a female and male member, as shown in FIG. 1. The male and female members are configured to click together forming a secure connection between two loose ends (for purposes of this disclosure, the position in which the two members are joined is referred to as "locked," meaning that the two members are securely connected). The male member 12 is comprised of a catch assembly 14, a rod 16 and two spring arms 15. Each spring arm 15 has a retaining block 18. The female member 13 is comprised of a housing 20 and a catch assembly. Housing 20 has two side holes 22. To latch the buckle 10, the rod 16, and two spring arms 15 slide into housing 20 and retaining block 18 on spring arms 15 pop slightly outward to rest in side hole 22 on each side of housing 20 (the "locked" position). To unlatch the buckle 10, the user presses on retaining block 18 biasing spring arms 15 inward while pulling male member 12 away from female member 13. Side release buckles are typically more secure than hook and loop fasteners (Velcro®) and less burdensome than a standard knot. Therefore, side release buckles are found on various items.

In some instances, side release buckles are used on items for safety, such as helmets, car seats, safety vests and life jackets. In other instances, side release buckles are used for practical fashion, such as fanny packs, belts, backpacks, luggage, shoulder bags, jackets and pet collars.

Oftentimes light emitting diodes or LEDs are embedded in textiles or plastics (such as helmets). Light emitting diodes or LEDs are small light bulbs that do not include a filament that will burn out. LEDs stay cool to the touch and have a longer lifespan than a typical incandescent bulb. Because of these characteristics LEDs is ideal for implementation on or in the types of items discussed above. However, to activate these LEDs a small button or switch located somewhere on the item must be pushed or engaged.

A switch is an electrical component that can open or close an electrical circuit, as shown in FIGS. 2-4, electrical schematic diagrams. FIG. 2 is a prior art simple circuit diagram to drive an LED. The switch selectively couples electrical energy from battery B 130 to a light source (LED) 120 for selectively producing light. The battery 130 is connected in series with a current limiting resistor (ballast resistor) 110 and an LED 120. FIG. 3 shows a circuit diagram driving LEDs in parallel. Although somewhat more problematic, it is possible to have parallel LEDs. A LED circuit with an integrated chip is shown in FIG. 4. The integrated chip 140 allows for greater control over the LED circuit (e.g. lights can be programmed to flash or slowly change colors).

FIG. 14 is a prior art simple schematic diagram showing the components of Wi-Fi® connection in a video doorbell. This schematic is shown as a mere example, depicting the components of a device that uses Wi-Fi® connection to connect a device with a camera to a smart phone. In FIG. 14, a user will activate video doorbell 200, typically by pressing button 180. This triggers video doorbell 200 to communicate with a nearby Wi-Fi® router 190 in which it is connected to. Thus, devices like the one shown in FIG. 2 require access to the internet to work properly. Wi-Fi® router 190 then communicates with cell tower 210, which feeds wireless cell service to mobile device 76. The result is that a user of mobile device 76 is able to directly view and hear the environment surrounding video doorbell 200, typically from an app downloaded on said mobile device 76. This provides the advantage of a user to monitor a location where he or she is not physically present at said location, such as their home when they are at work.

FIG. 15 is a prior art simple schematic diagram showing use of Bluetooth® pairing of a car's entertainment system to a smart phone. FIG. 15 shows the use of Bluetooth® pairing of two devices such that the car shows many features of the smart phone. Unlike Wi-Fi® connection, Bluetooth® pairing is done without the need for cables, pairing two devices via radio waves. However, for the pairing to work properly, the two devices must be near each other. Each device must have its Bluetooth® capabilities turned on, and typically each device must allow for the pairing to occur, as an added security measure. As can be seen in FIG. 15, mobile device 76 has obtained Bluetooth® connection 220 with car entertainment system 210. As a result, in this instance, mobile applications 78 present on mobile device 76 appear on car entertainment system 210 as well. This result pairing is typically of Bluetooth® connection, wherein the two paired devices can effectively communicate or mimic each other. This type of connection is useful to mobile device users, allowing great control over other paired devices using one single device (the smart phone, for example).

In each type of electrical event including embedded LEDs, the user is required to turn on and off the device which often results in a user failing to activate or deactivate the electrical element (such as the LEDs, GPS unit, camera, etc). Thus, the user might run down the battery by leaving the switch closed (LEDs on, Bluetooth® on, camera on) or fail to activate the electrical elements when using the item. Therefore, what is needed is a device that activates the elements when the user closes or "locks" the buckle on an item.

There is a need for activation of Wi-Fi® and Bluetooth® connections, as shown in FIGS. 14-15, in the field of safety devices, allowing for further monitoring and supervision of children when a guardian is not in the immediate vicinity, but the buckle is "closed" or "locked." This need arises when a child is in a car seat or riding a bike in a park, as examples. This will provide added security and safety features that are not currently present in the prior art. Guardians have no way to currently receive a notification if a buckle on an item such as a helmet, backpack or car seat is closed.

Additionally, Global Positioning System ("GPS") capabilities may also be used, wherein a network of satellites orbiting the Earth provide signals of the location of the present device via a mobile application on a mobile device. Said signals calculate the location of the present device by determining how far away each satellite is from the GPS receiver (the present device), based on how long it takes for the messages to arrive. This method is typical of GPS-enabled devices in the prior art. The present device may be utilized on helmets, backpacks, and child car seats, for example.

What is needed is a device that activates a mobile application on a mobile device to allow a user to connect with the device and thereby view GPS location, video footage from a camera or simply receive an alert when the user closes or "locks" the buckle. The present invention achieves this objective, as well as others that are explained in the following description.

BRIEF SUMMARY OF THE INVENTION

The present invention is a side release buckle device. The device is comprised of a male member and a female member. The female member has a housing, a catch assembly (for connection to a strap and/or item) and at least one conductive contact point. The male member is capable of interlocking with the female member and has an arm assembly, a catch assembly and at least one conductive contact point. At least one switch is formed by the contact between the conductive contact point of the male member and the conductive contact point of the female member. An electrical circuit traverses the female and male member, such that when the members are "locked" together the switch is closed and when the members are apart the switch is open. The electrical circuit has a series of wires, a source of electrical energy, a currently limiting resistor, at least one switch and at least one other element (light source, integrated chip or at least one microcontroller) that triggers an event. The element may also include be a Bluetooth® RF transceiver or Wi-Fi® enablement, in which a user can then pair their mobile device to the present device through a mobile application. For example, the device could be attached to an item such as a belt, a safety vest, a backpack or anything else that can utilize a side release buckle.

The device may further comprise at least one computer chip or microcontroller, triggering an external camera upon closure of the circuit and sending a signal to mobile application in which the viewer can view live footage streamed from the camera. The device may also contain a GPS-tracking device, such that a user is able to locate the item on a mobile application using their smart phone. An audible beeping noise may be triggered upon closure of the electrical circuit, wherein the electrical element is a sound-making device.

When the side release buckle is locked (male member and female member are closed together), the electrical element triggers an electrical event, and when the buckle is released, the electrical event ceases. This feature allows a user to avoid having to engage an on or off switch when utilizing an item.

Figure 1:
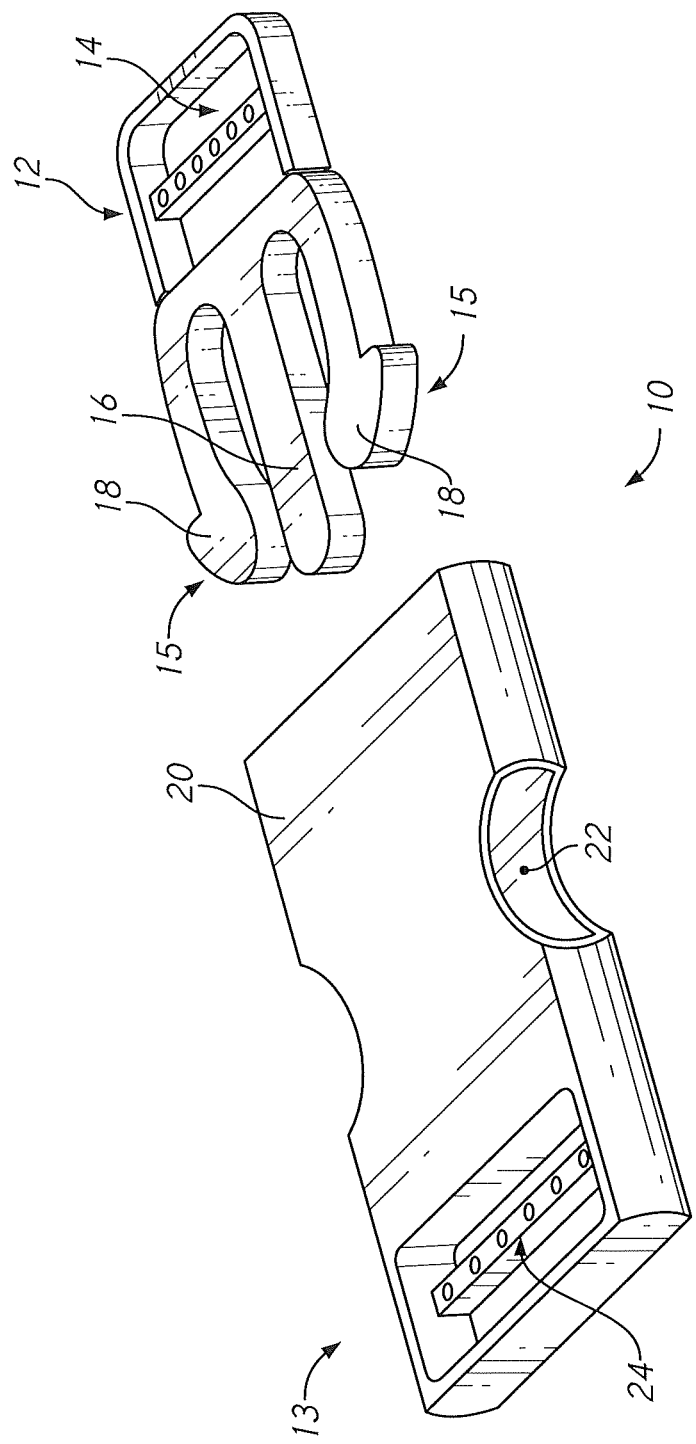
FIG. 1 is a perspective view, showing a prior art side release buckle.
Figure 2:
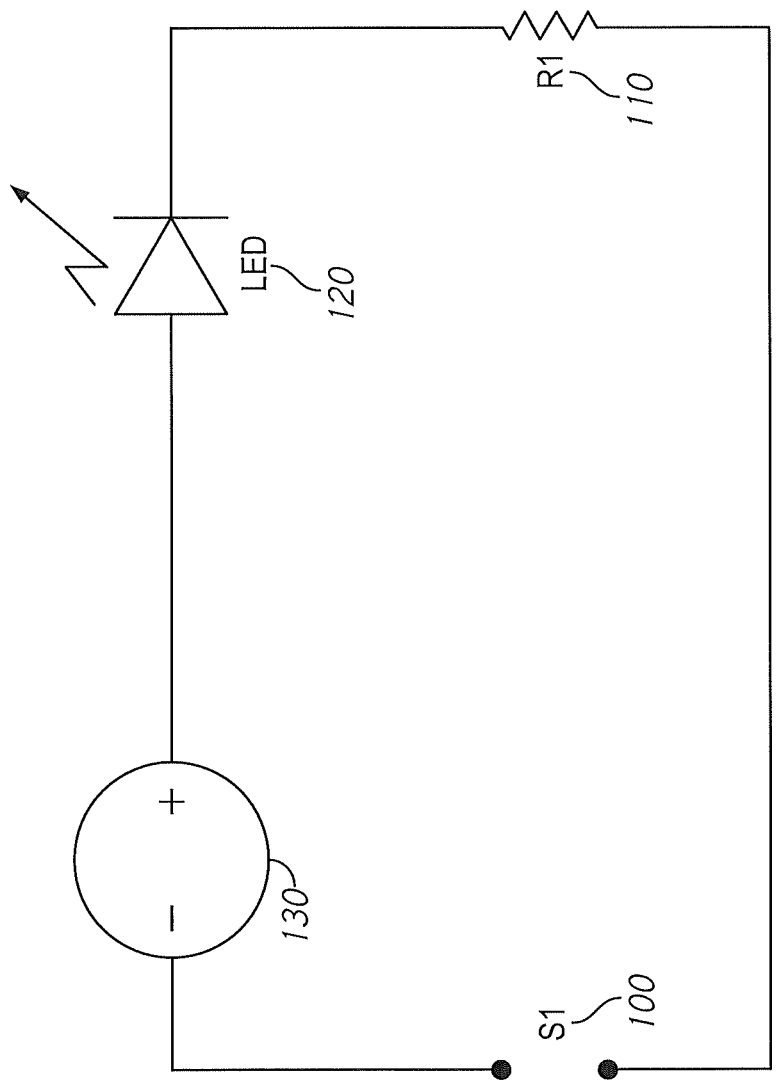
FIG. 2 is a schematic diagram, showing a prior art simple circuit to drive an LED
Figure 3:
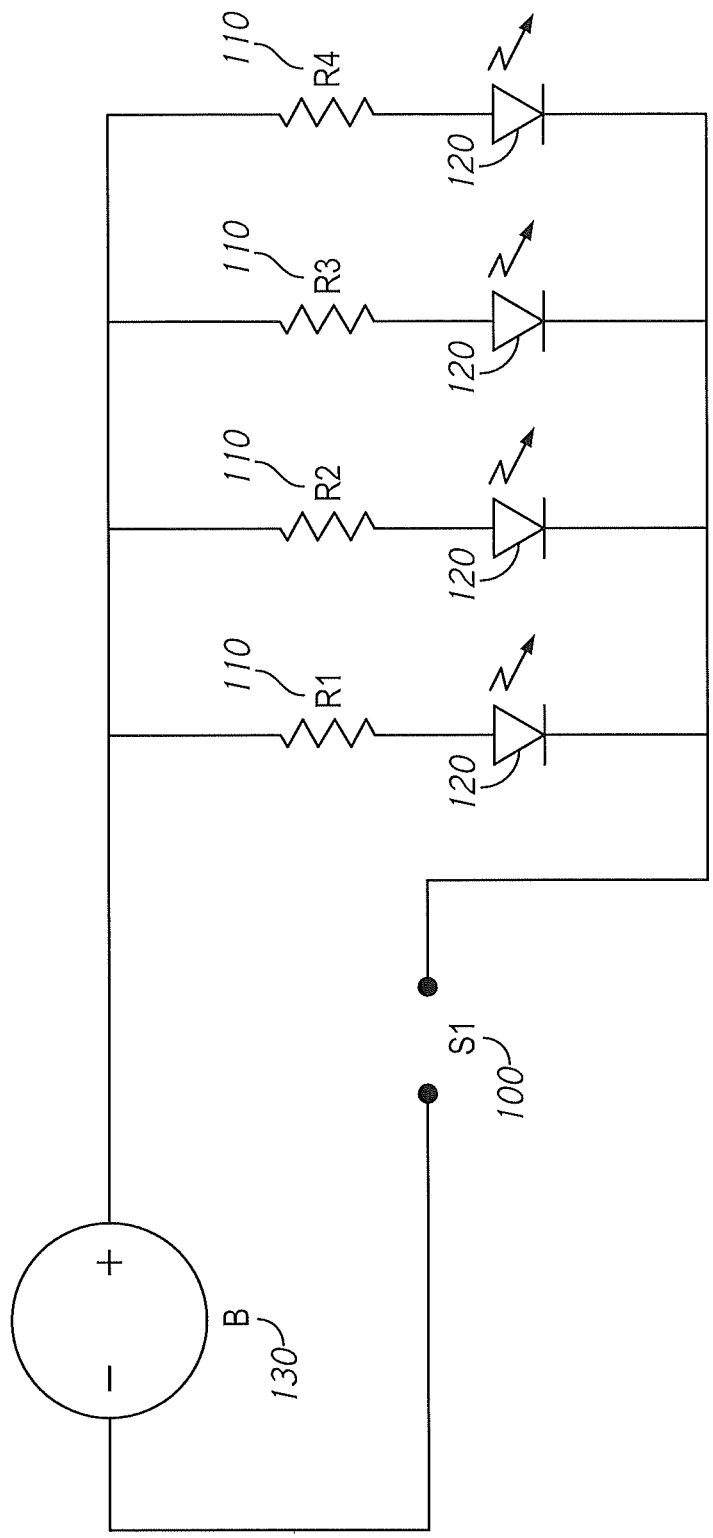
FIG. 3 is a schematic diagram, showing a prior art circuit diagram driving LEDs in parallel.
Figure 4:
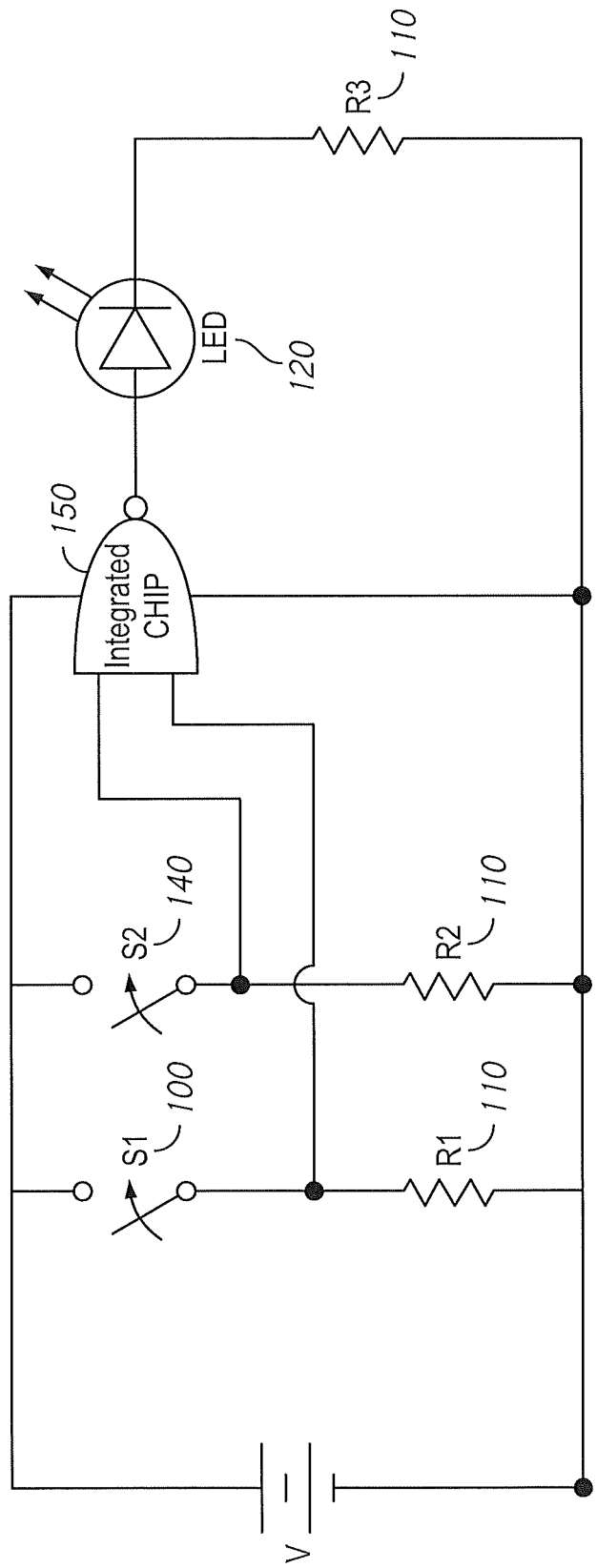
FIG. 4 is a schematic diagram, showing a prior art LED electrical circuit with an integrated chip.

REFERENCE NUMERALS IN THE DRAWINGS 10 side release buckle
12 male member
13 female member
14 catch assembly
15 spring arm
16 rod
18 retaining block
20 housing
22 side opening
24 catch assembly
26 first contact point
27 second contact point
28 housing
30 side release buckle device
32 male member
33 female member
34 rod
36 catch assembly
38 retaining block
39 spring arm 40 side opening
42 LED
44 LED strip
46 arm assembly
48 arm assembly wire
50 first housing contact point
52 second housing contact point
54 wiring
56 item
58 first electrical circuit
59 second electrical circuit
60 first switch
62 second switch
64 contact point
66 contact point
68 straps
70 USB
72 microcontroller
74
76 mobile device
78 mobile application
80 camera
82 Global Positioning System unit
84 speaker
86 strip
88 microphone
90
100 first switch
110 resistor
120 light emitting diode
130 charge (battery)
140 second switch
150 integrated chip
160 heating strip
170 fuse
180 doorbell
190 Wi-Fi® router
200 video doorbell
210 car entertainment system
220 Bluetooth® connection

DETAILED DESCRIPTION OF THE INVENTION

Figure 5:
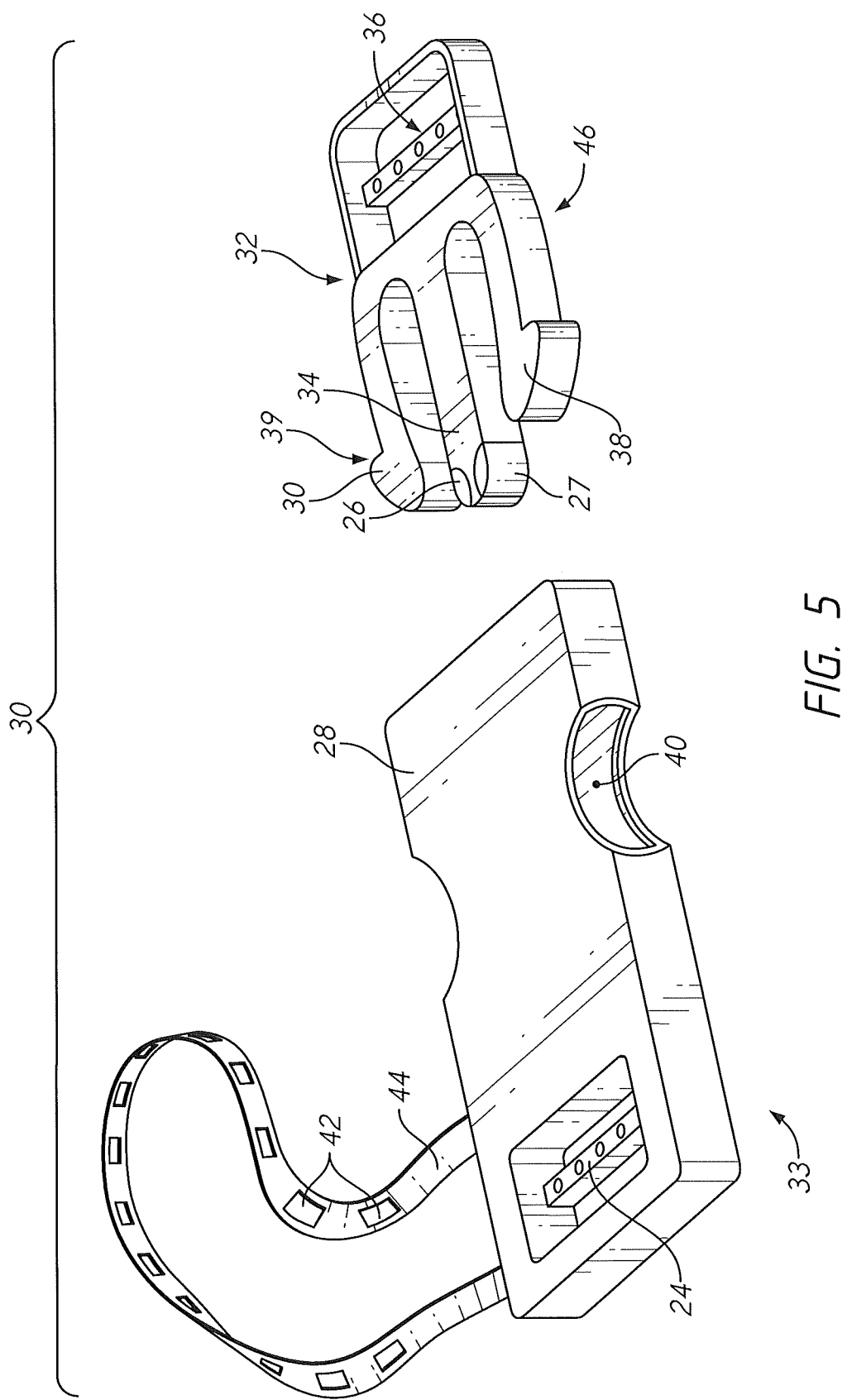
FIG. 5 is a perspective view, showing the side release buckle device.

Side release buckle device 30 has a female member 33 and a male member 32 configured to interlock and easily release, as shown in FIG. 5. An electrical circuit 58, 59 (shown in FIGS. 7 and 11) transverses female member 33 and male member 32 and has a source of electrical energy 130 (e.g. a battery), a current limiting resistor 110 (e.g. a ballast resistor), at least one switch (100, 140) and a light-emitting diode ("LED") 120. While this electrical circuit 58, 59 is shown, electrical circuit 58, 59 could be any known electrical circuit. For example, LED 120 could be any electrical element (e.g. heating strip 160). Light source 120 is connected to or embedded in item 56 (illustrated in FIG. 12). In one embodiment, these elements are connected in series, as set out in FIG. 7. When male member 32 and female member 33 are connected the switch(es) 100, 140 are closed, thereby completing the circuit 58 and providing power to light source 120.

Returning to FIG. 5, side release buckle device 30 is shown in one embodiment, without item attached. Instead, LED strip 44, including LEDs 42 are shown extending directly out of female member 30. The reader will appreciate that LED strip 44 can extend outward in any direction from female member 30 and is preferably connected to or integrated with item (not shown). For example, LED strip 44 could extend outward in the direction of catch assembly 24 on female member 30, such that if there is a belt or strap secured therein, the LED strip 44 is seamlessly integrated with that belt or strap. Male member 39 has an arm assembly 46 comprised of two spring arms 39, each having a retaining block 38 and a central rod 34. In one embodiment, rod 34 includes a first contact point 26 and a second contact point 27. While the contact points are shown on rod 34, contact points can be located at any point on male member 32 where male member 32 contacts female member 33 in a "locked" position. Contact points can be made of any conductive material. For example, contact point could simply be a portion of the arm assembly 46 itself, with a thin layer of nickel on the surface (a process known as nickel electroplating). Wiring 54 (shown in FIG. 8-9) is required to connect all portions of the electrical circuit (58, 59) other than switches (60, 62).

Figure 6:
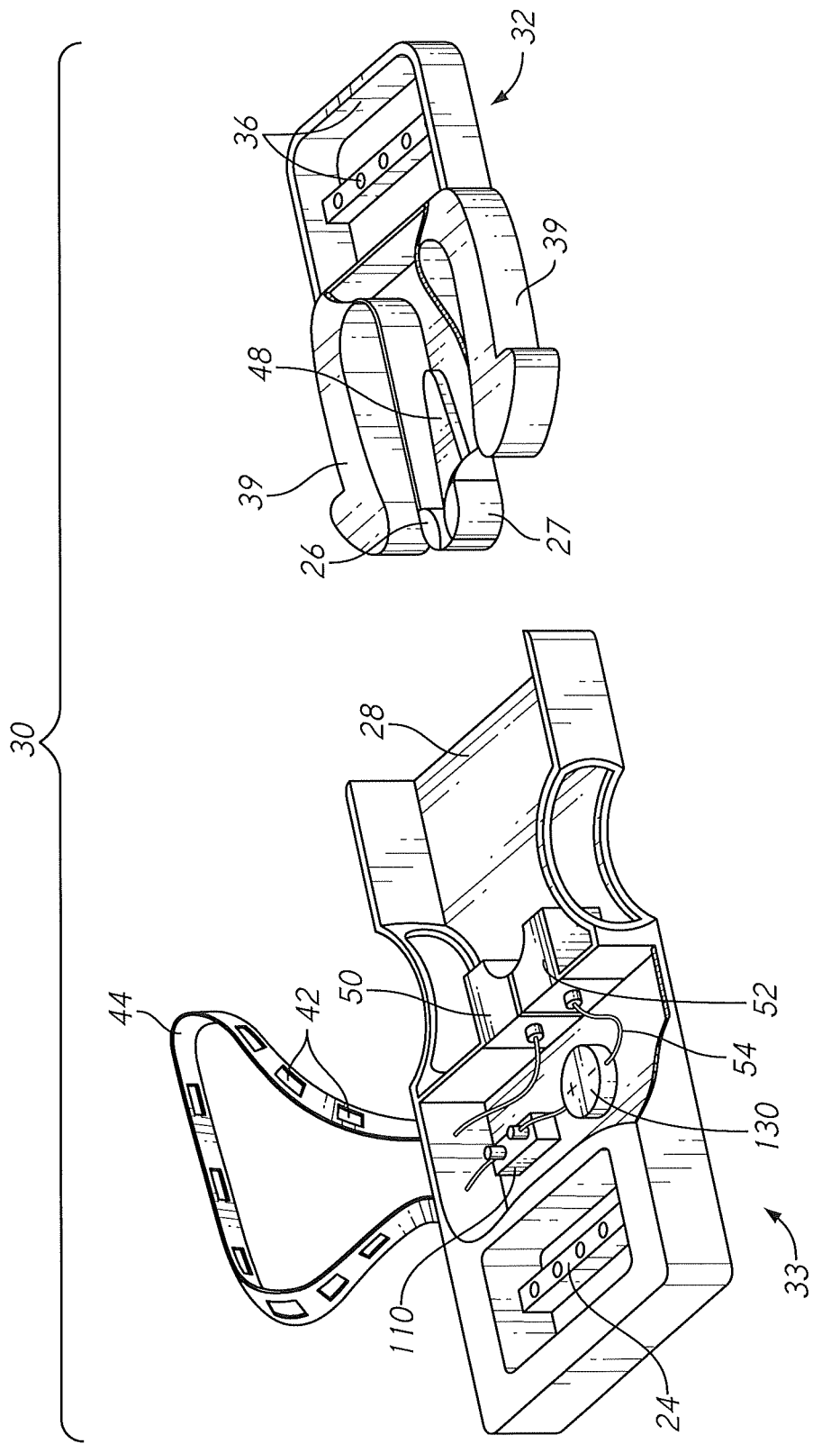
FIG. 6 is a cut away view, showing the side release buckle device and internal components.

FIG. 6 is a cut away view, showing the internal components of male member 32 and female member 33 proximate contact points 26, 27. Arm assembly wire 48 connects first contact point 26 to second contact point 27 of rod 34. In this embodiment, a large portion of electrical circuit 58 is housed within housing 28 of female member 33, such that electrical circuit 58 is not visible. Female member 33 includes a source of electrical energy, in this case a battery 130 that is connected in series through wiring 54 with a ballast resistor 110. Two switches (60, 62) are formed by the connection between female member 33 and male member 32, as shown in FIGS. 6-9. Specifically, a first switch 60 is formed between a first contact point 50 on female member 33 and a first contact point 26 on male member 32. A second switch 62 is formed between a second contact point 52 on female member 33 and a second contact point 27 on a male member 32.

Figure 7:
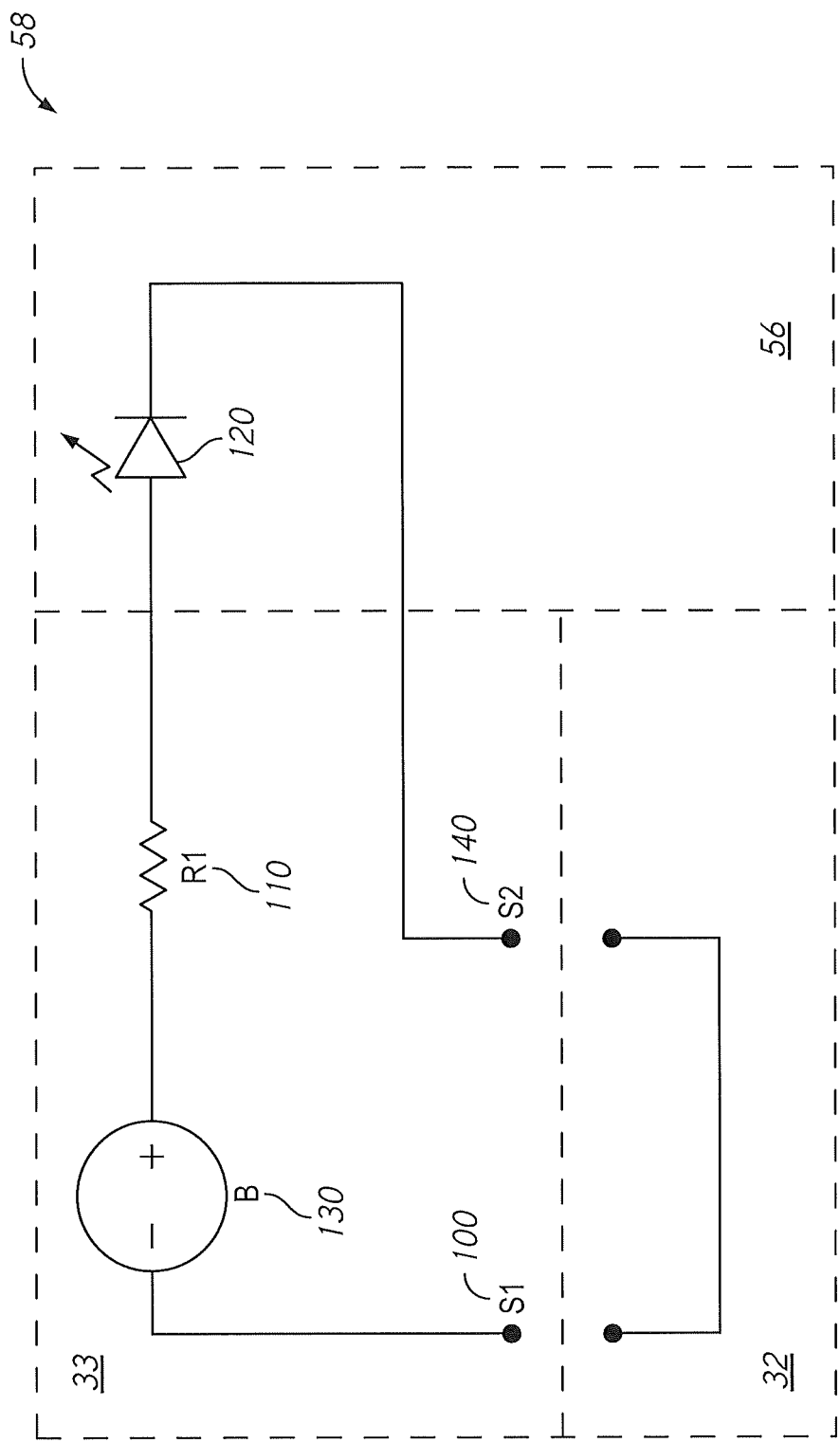
FIG. 7 is a schematic diagram, showing the present LED electrical circuit.

A schematic view of the electrical circuit 58 is shown in FIG. 7. Battery 130 is connected in series with a resistor 110, LED 120 and two switches 100, 140. As shown, the electrical circuit 58 transverses male member 32 and female member 33, with closed switches 100, 140 formed by the contact between male member 32 and female member 33. While the battery 130 and resistor 110 are shown in female member 33, these components could also be housed within male member 32, so long as the electrical circuit 58 is complete.

Figure 9:
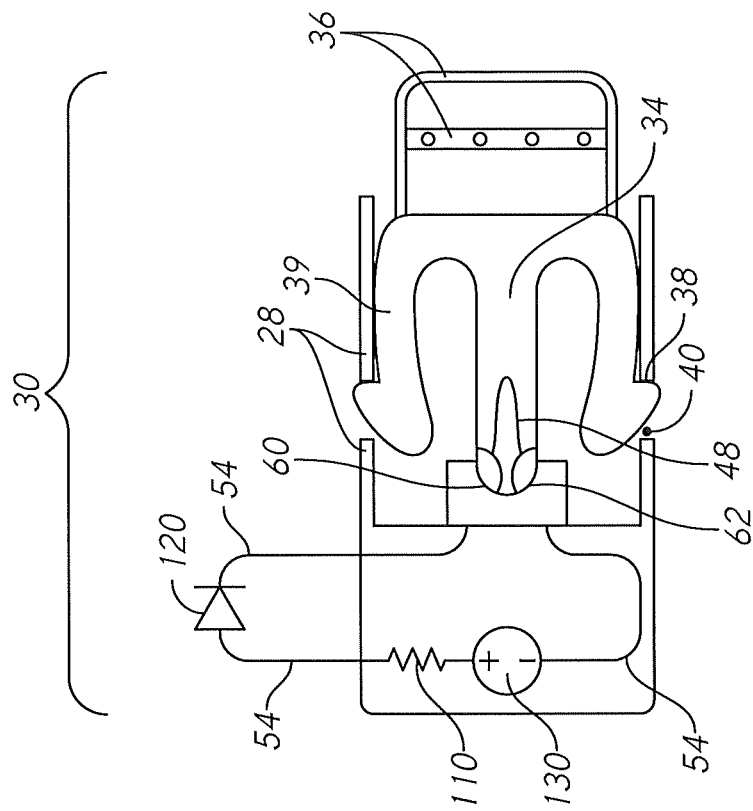
FIG. 9 is a schematic diagram, showing the present side release buckle device with switches closed.
Figure 8:
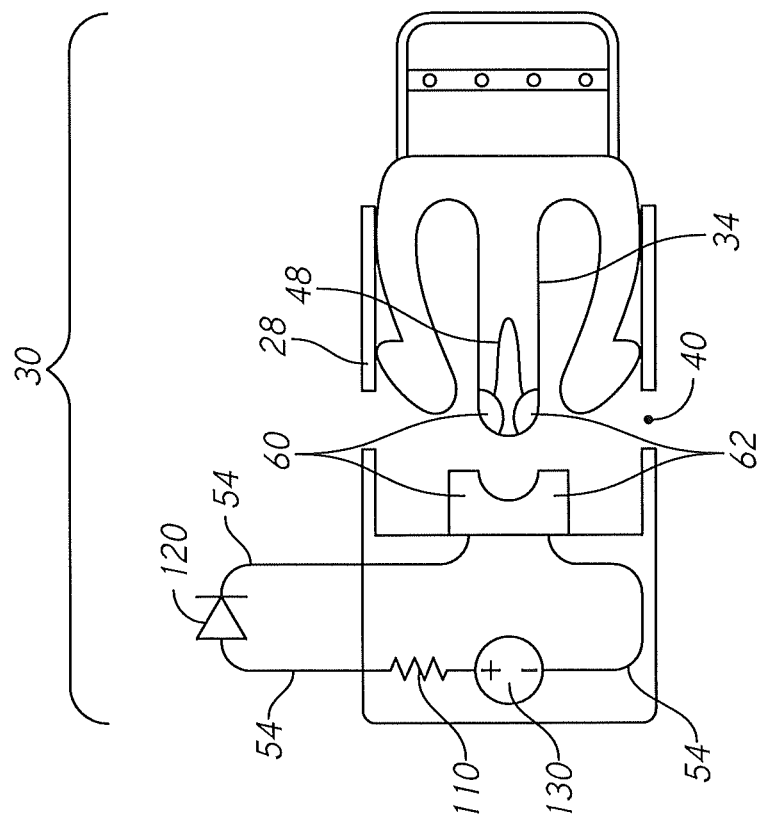
FIG. 8 is a schematic diagram, showing the present side release buckle device with switches open.

The device 30 is shown with switches (60,62) open in FIG. 8, wherein the contact points are not touching and therefore light source 120 is off. In FIG. 9, the switches (60, 62) are closed (contact points are touching) thereby completing the circuit and illuminating the light source 120. Therefore, when a user "unlocks" or disconnects the two members (32, 33), the light source 120 is off, thereby conserving energy. When a user connects the two members (32, 33) together the light source 120 turns on, thereby ensuring that the light source 120 is on.

Figure 10:
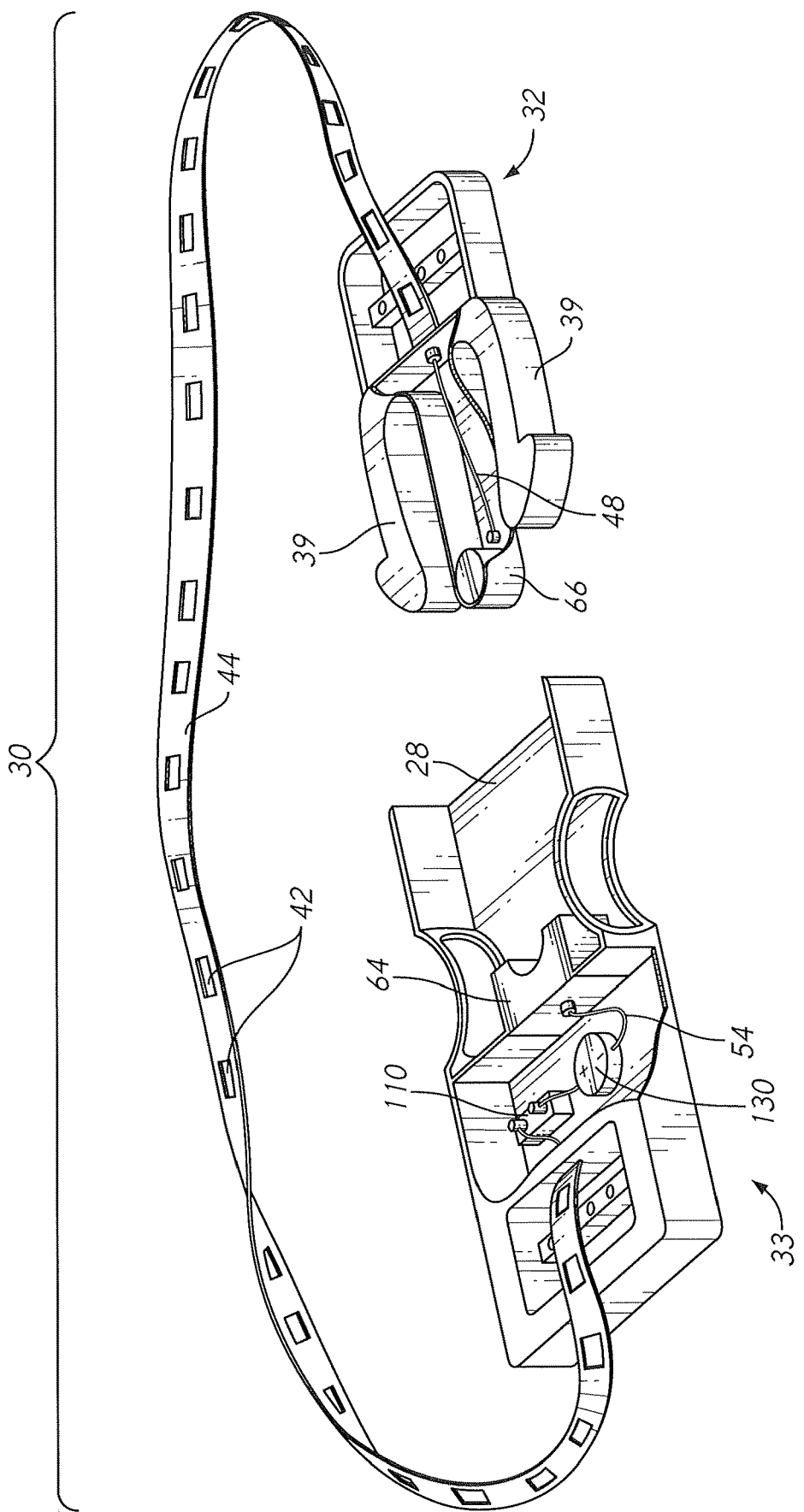
FIG. 10 is a cut away view, showing another embodiment of the side release buckle device.
Figure 11:
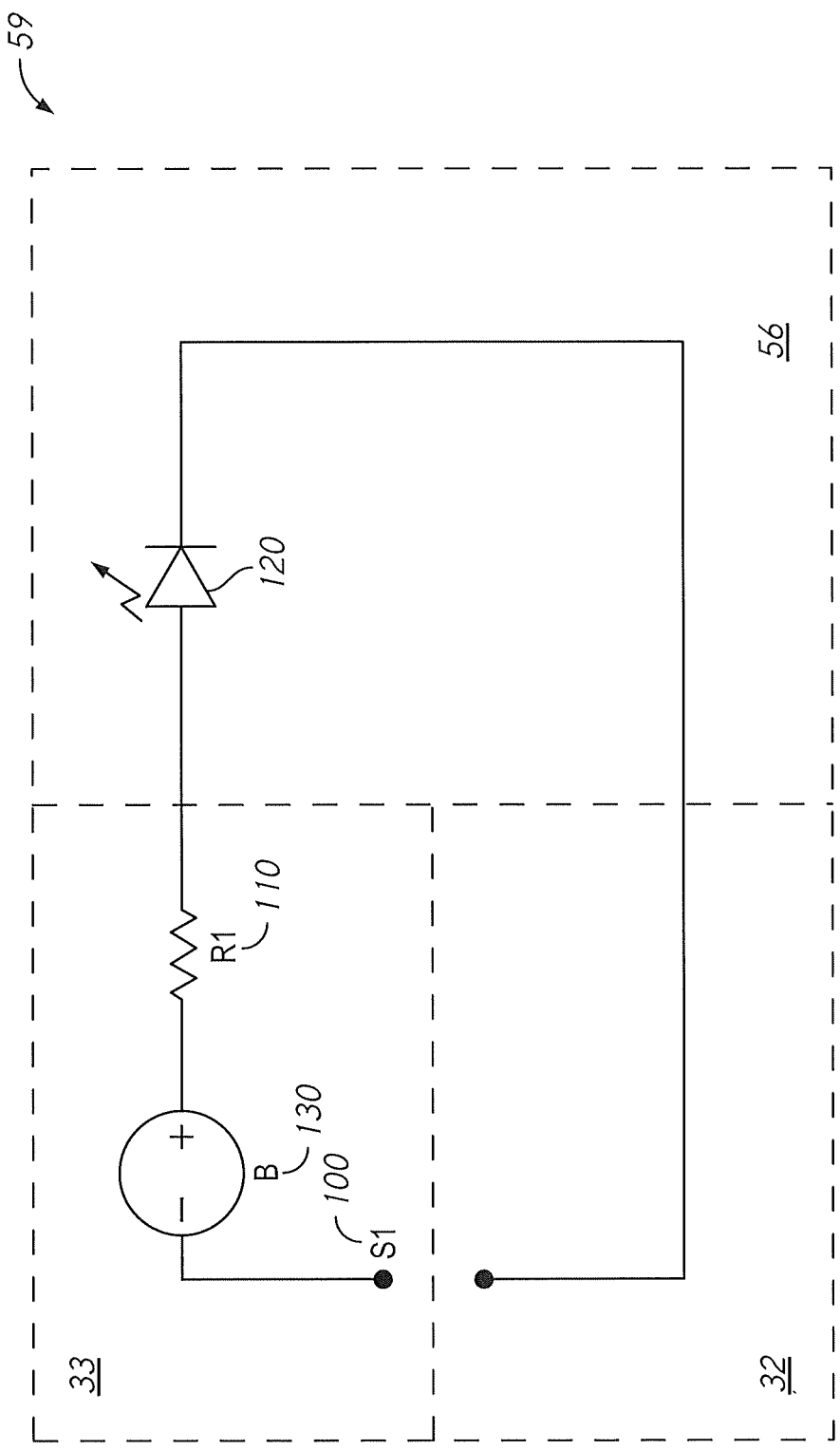
FIG. 11 is a schematic diagram, showing another embodiment of the LED electrical circuit.
Figure 12:
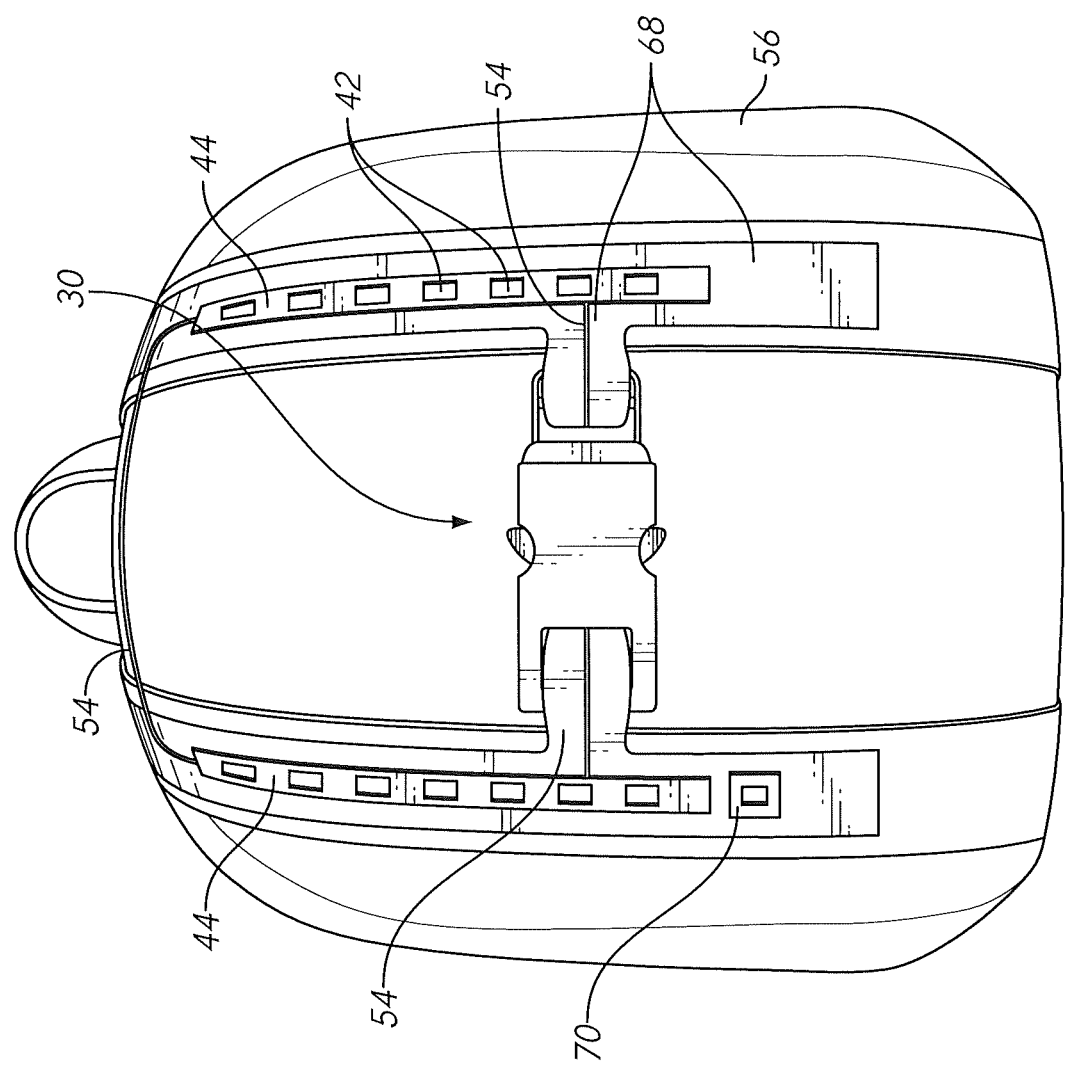
FIG. 12 is a perspective view, showing the side release buckle device on an item.

A second embodiment of device 30 is shown in FIGS. 10 and 11. In the second embodiment, resistor 110 and battery 130 are connected through wiring 54 to contact point 64. One switch 100 is formed between contact point 64 and contact point 66. Arm assembly wire 48 connects contact point 66 to LED strip 44 which includes embedded wiring which runs between each LED 42. LED strip 44 can be embedded or connected to any item and return to female member 33 to complete the electrical circuit 59.

Figure 13:
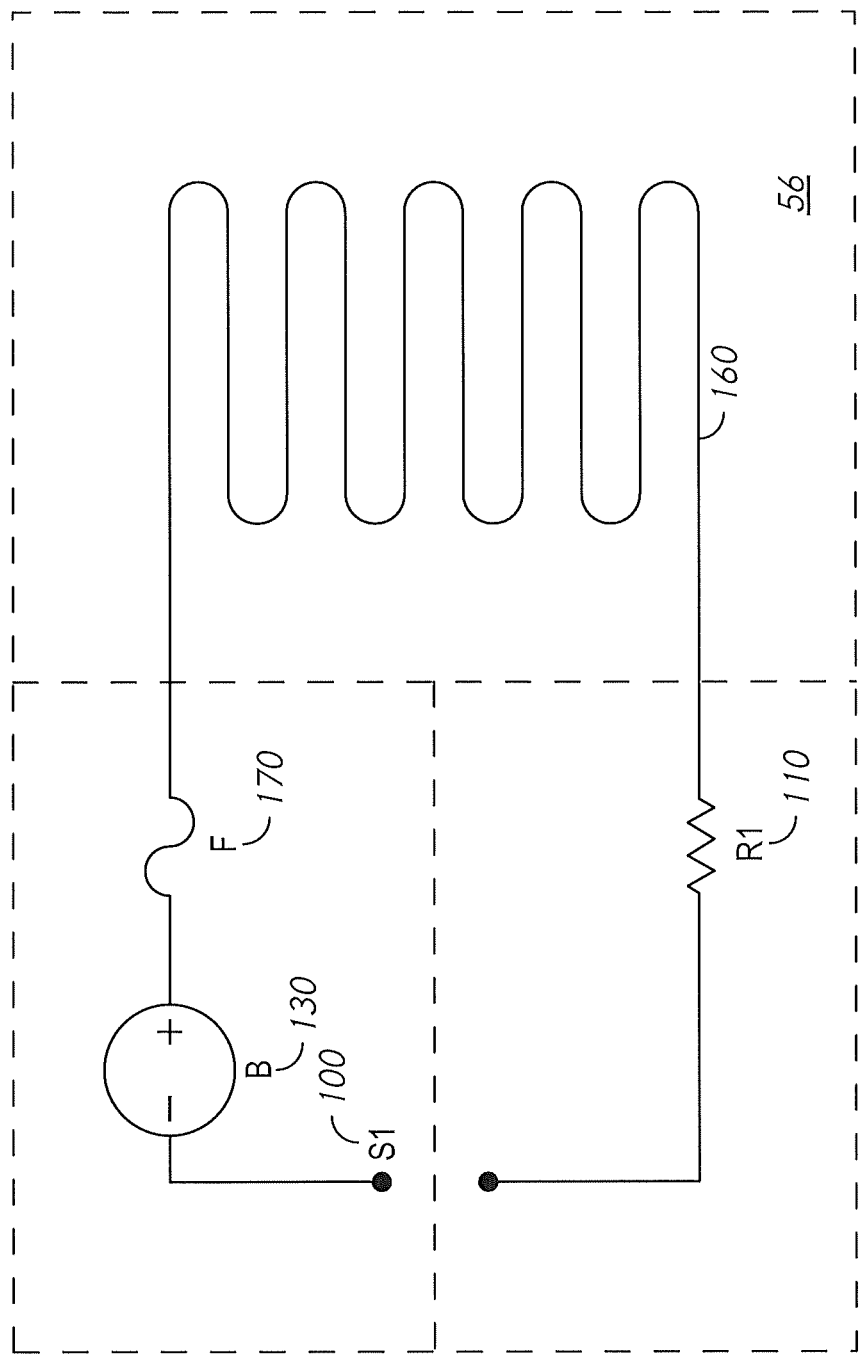
FIG. 13 is a schematic diagram, showing a heating element connected in circuit within the side release buckle device.
Figure 14:
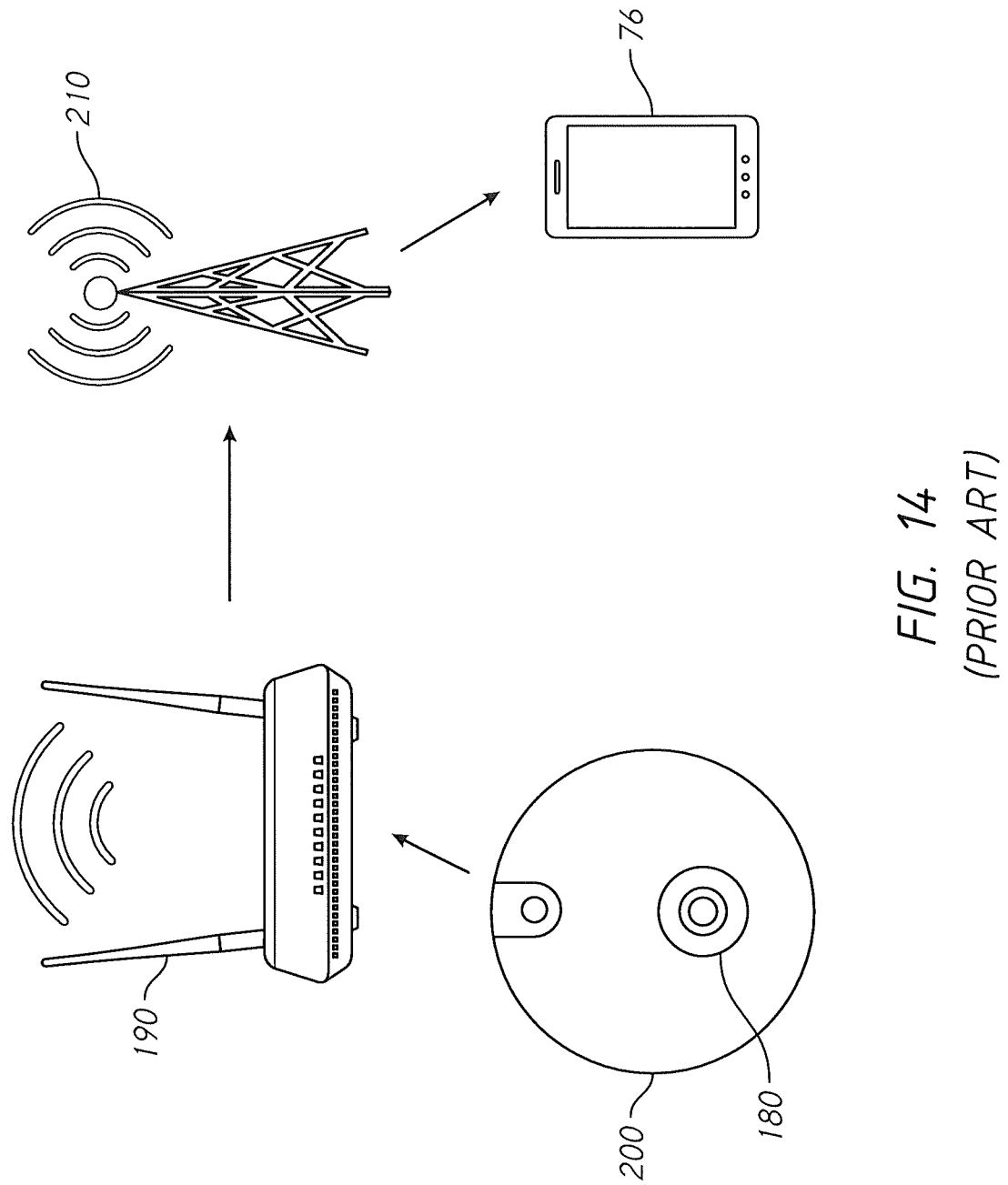
FIG. 14 is an exemplary schematic diagram, showing a prior art connection of a video doorbell to a smart phone via Wi-Fi® connection.
Figure 15:
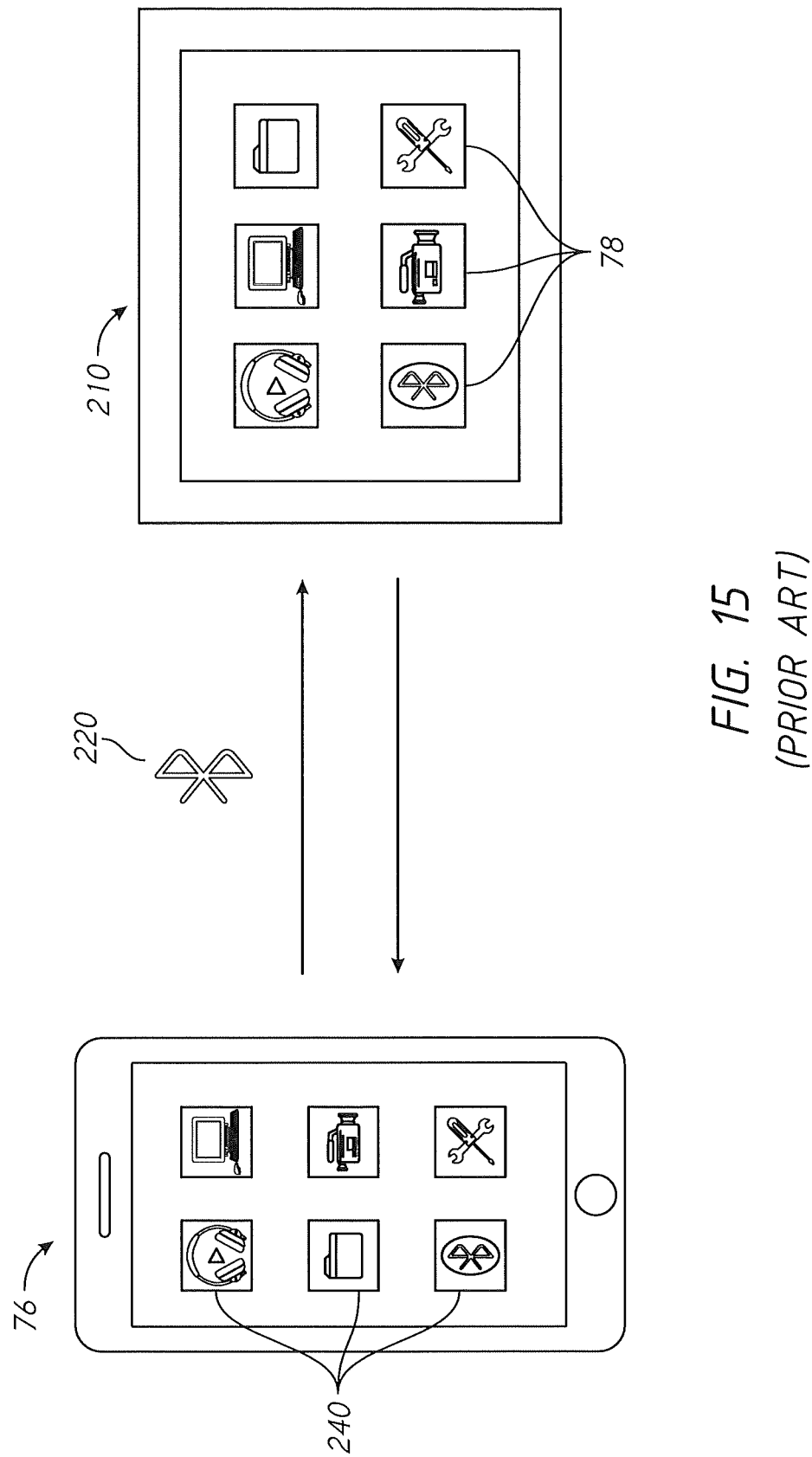
FIG. 15 is an exemplary schematic diagram, showing a prior art Bluetooth® pairing connection between a mobile device and a car entertainment system.

The reader will appreciate that device 30 can be applied to any type of item that can incorporate a side buckle release device 30. Some examples include safety items, such as helmets, life preserving vests, safety or construction vests and practical fashion items, such as fanny packs, belts, backpacks, luggage, shoulder bags, jackets and pet collars. Several items require waterproofing material and therefore the side buckle release device 30 should be securely waterproof. A backpack is shown as item 56 in FIG. 12. Wiring 54 can extend through straps 68 to LED strip 44. Additional wiring 54 can be embedded or hidden within backpack material to connect LED strips 44 together and complete the circuit 59. The present invention should not be limited to powering LEDs 42. It should be known that other electrical components could be powered by device, such as a heating element or Global Positioning System unit. Another electrical circuit is shown in FIG. 13, wherein heating element 160 is connected in circuit with fuse 170, battery 130 and resistor 110. Thus, when the switch 100 is closed, heating element 160 is activated. Any known GPS unit (such as TrackR®, headquartered in Santa Barbara, Calif.) could also be integrated into the device, allowing a user to use locational services.

Further, a USB charging port 70 can be integrated into the design to allow the use of a rechargeable battery 130. The user could easily plug the device into an external power source for charging purposes.

Figure 16:
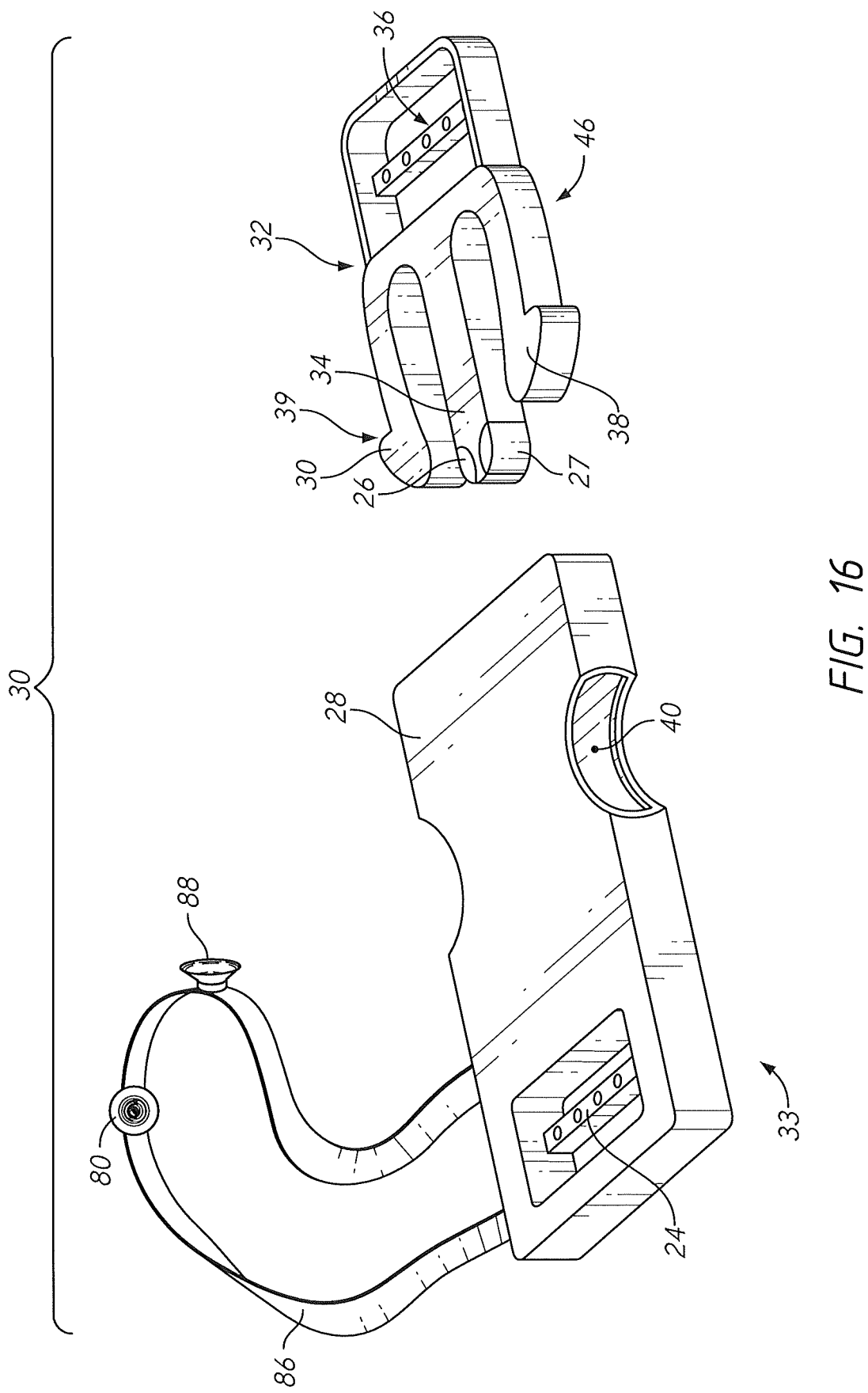
FIG. 16 is a perspective view, showing the side release buckle device.
Figure 18:
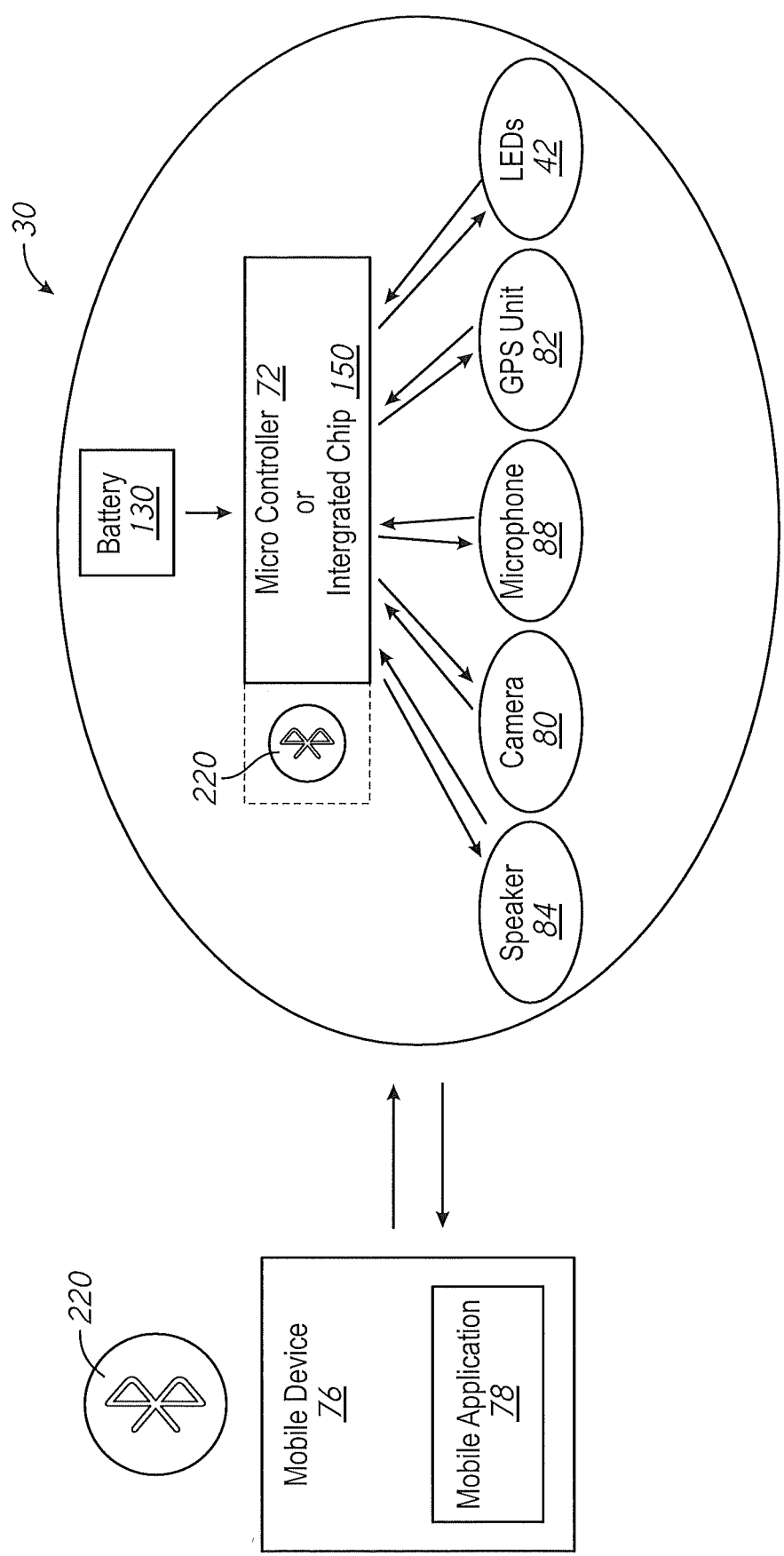
FIG. 18 is a schematic view, showing the interaction between the mobile device and present invention.

FIG. 16 shows yet another embodiment of device 30 with additional electrical components. In this embodiment, side release buckle device 30 still has a female member 33 and a male member 32 configured to interlock and easily release. As shown in FIG. 18, at least one microcontroller 72 (or at least one integrated chip 150) is utilized to connect device 30 with mobile device 76. Mobile application 78 resides on mobile device 76 and once connected to at least one microcontroller 72 can communicate with side release buckle device 30. The reader will appreciate that an electrical circuit similar to that disclosed in FIGS. 7 and 11 could be used. However, the electrical circuit would be modified to include at least one microcontroller 72 and other selected elements to allow such connection as is known in the art. As described above, when the circuit is closed, an event is triggered, powering device 30. Thus, returning to FIGS. 7 and 11, when male member 32 and female member 33 are connected, the switch(es) 100, 140 are closed, completing the circuit 58 and triggering the electrical event. Previously, this event described powering LEDs. In this embodiment, the event can trigger a series of electrical elements. FIG. 18 illustrates the interaction between the electrical elements and mobile device 76. When the circuit is closed, battery 130 powers circuit and triggers at least one microcontroller 72 (or other integrated circuit 150) to seek connection to an external mobile device 76 via Wi-Fi® or Bluetooth® connectivity. If that connection is successful, mobile application 78 located on mobile device 76 can send a notification to the user that the circuit was closed and is connected. Additionally, mobile application 78 acts as a control for many of the elements within device 30.

Device 30 can connect in any known manner to mobile device 76. In one embodiment Bluetooth® acts to connect device 30 to mobile device 76. Bluetooth® connects at least two devices without the presence of wires, unlike Wi-Fi® connection. Typically, a radiofrequency ("RF") transceiver is used (and would be incorporated into device 30). It uses the same range of frequencies used in Wi-Fi® but employs a frequency-hopping transceiver to compete with fading and interference. A Bluetooth®-enabled device shares a physical radio channel with other devices that are paired to it, using the same frequency-hopping pattern.

Alternatively, the device 30 may use Wi-Fi® connections to pair with other communication devices, such as a mobile device 76, as shown in FIG. 18. Wi-Fi® networks use radio waves in order to transmit information through a network. A wireless adapter is required to translate the data sent into the radio signal, which is then transmitted to the router. The router "decodes" the signal, which is then sent to the Internet, typically through a wired connection.

Once paired or connected, at least one microcontroller 72 on device 30 can utilize other elements to take advantage of many different features. These elements include, but are not limited to cameras 80, speakers 84, microphones 88, Global Positioning System units 82 and LEDs (as previously described).

By enabling a user to connect with device 30, the user operating a connected mobile application 78, can control and/or observe device 30 for safety or other purposes. For example, at least one microcontroller 72 may interact with a camera 80 on device 30 in this embodiment. At least one microcontroller 72 could send a signal to a communication device 76, triggering live footage from the camera 80 located on device 30. A GPS-tracking device 82 may be incorporated into side release buckle 30 as well. The tracking device would use a typical process called trilateration, and its physical location will be determined based on the distance of the device to a network of Global Positioning System satellites. Any known GPS unit 82 (such as TrackR®, headquartered in Santa Barbara, Calif.) could also be integrated into device 30, allowing a user to use locational services. A speaker 84 could also be connected and integrated with microcontroller 72, such that sounds could be played remotely. Finally, LEDs or other lighting features could be added that could be controlled by the user remotely when the electrical event is occurring.

FIG. 16 illustrates the side release buckle device 30 without item attached. Device 30 has a strip 86 extending directly out of female member 30. The reader will appreciate that strip 86 can extend outward in any direction from female member 30 and is preferably connected to or integrated with item (not shown). For example, strip 86 could extend outward in the direction of catch assembly 24 on female member 30, such that if there is a belt or strap secured therein, strip 86 is seamlessly integrated with that belt or strap. Camera 80 and microphone 88 can be located along strip 86 on item in a desirable position to obtain the best video footage (e.g. the front of a helmet) or sound quality. The reader will appreciate that other components may be located either on strip 86 or within members 33, 32 of device 30. Male member 32 is identical to and described above in reference to FIG. 5.

Figure 17:
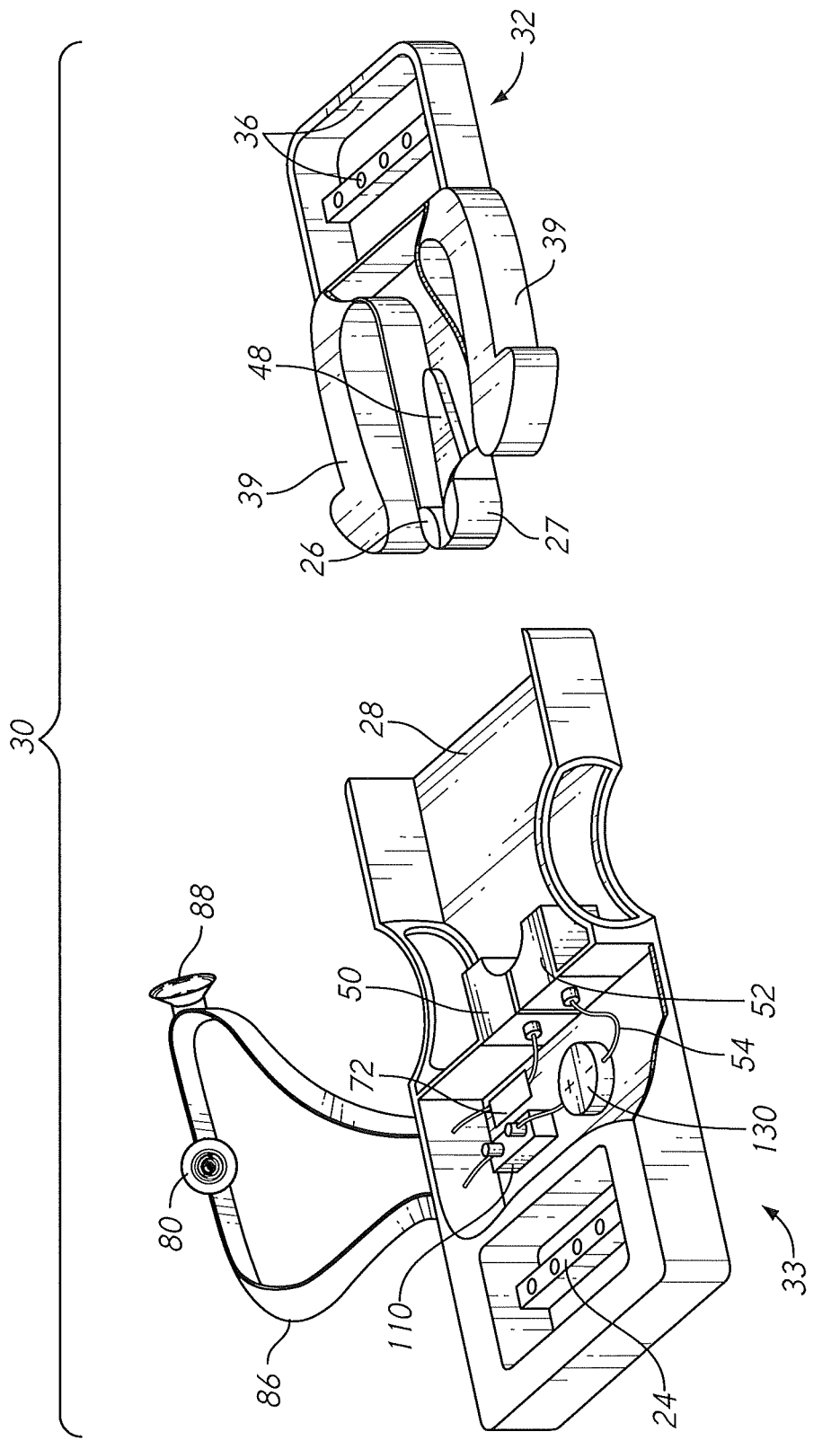
FIG. 17 is a cut away view, showing the side release buckle device and internal components.

FIG. 17 is a cut away view similar to FIG. 6 showing the present device 30. In FIG. 17, the reader will appreciate that at least one microcontroller 72 or similar element (integrated circuit) is located preferably within housing of female member 33. At least one microcontroller 72 would be connected to circuit in a known manner in order to allow the operation of microcontroller 72 when the circuit was closed (i.e. arm assembly wire 48 connects first contact point 26 to second contact point 27 of rod 34. This can be better understood by referencing the description of the same features within FIG. 6. The only difference is that FIG. 17 includes at least one microcontroller 72 or other similar element such as an integrated circuit (chip), along with other components such as microphone 88 and camera 80. The reader will appreciate that other components may include a speaker, GPS tracking unit or LEDs. There is no limit to the number of components that could be powered by or attached to device 30.

In the present embodiment side release buckle device 30 having strip 86 can be oriented in any manner as shown in the previously described embodiments. At least one microcontroller 72 is added to the circuits described and shown in the prior figures in a manner known in the art. Thus, FIGS. 5-13 would simply be modified to add at least one microcontroller 72 (or similar element) into the electrical circuit along with any desirable component part (i.e. camera, GPS unit, speaker, microphone). When the circuit is closed, the microcontroller 72 enables connection with mobile device 76. Microcontrollers 72 may require additional elements for proper operation dependent on what features or connections are desired. The present invention should not be limited by these additional elements. For example, a Bluetooth® RF Transceiver or a Wi-Fi® enabled connection may be required. These elements would be included in the electrical circuit or with the microcontroller 180 in a known manner.

Additionally, a wireless camera may be utilized with the present embodiment. As an example, this embodiment may be used when external camera is separate and not physically connected to device 30 (i.e. not directly connected to strip 86). Thus, for example, at least one microcontroller 72 (or integrated circuit) will send a signal to a mobile application on a mobile device, triggering the activation of the external camera. Thus, the user will be able to view live footage from the camera on the mobile application on the mobile device, simply by the closure of device 30 and closure of the circuit. This embodiment is particular useful in baby and child car seats. The top latch of a child's car seat belt would act as side release buckle 30. A camera would be nearby, typically facing the car seat. The user of the smart phone has the advantage of viewing a live stream of the car seat, as an example, providing for added security and supervision while the user may not be able to directly view the car seat. Additionally, if the buckle is not released (e.g. if the child is left in the car seat when the user exits the car), the mobile application could send a notification to the user that the camera is still activated even though the user has left the direct vicinity of the car seat. It is in this manner that the user could be notified that they have left their child in the car. This advantage is made possible through the closure of side release buckle 30, and in turn, the closure of the internal circuit.

Figure 19:
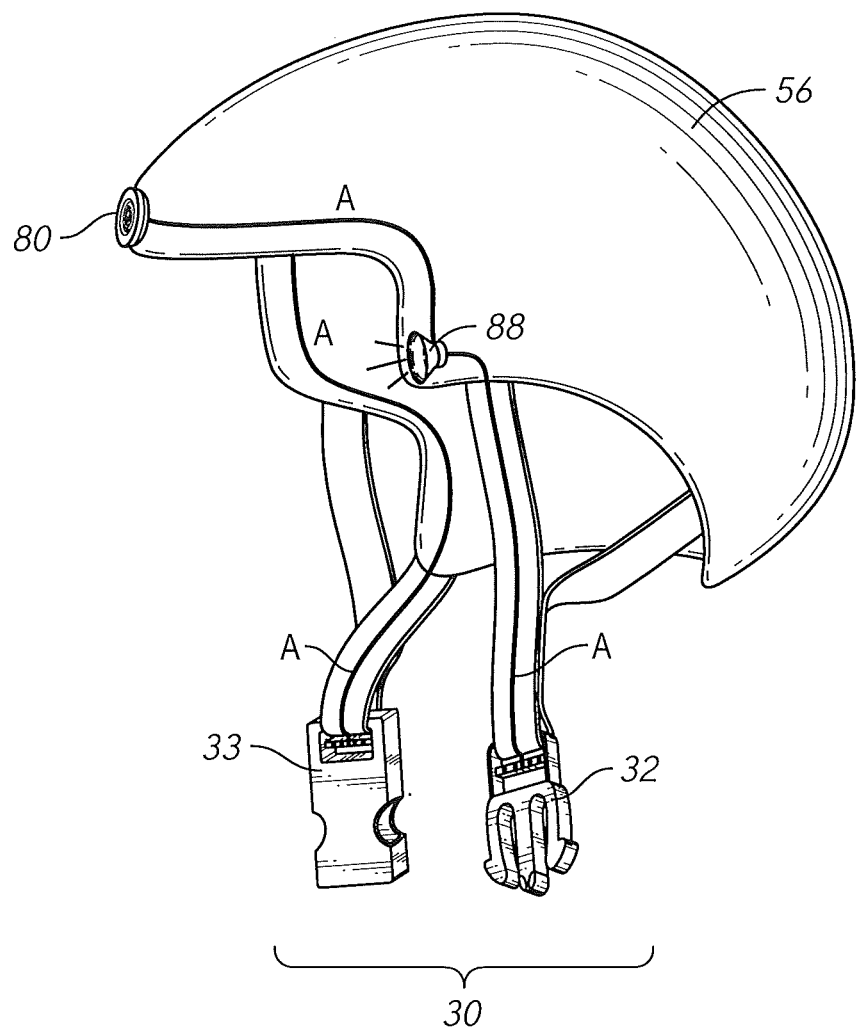
FIG. 19 is a perspective view, showing the present invention on a helmet.

FIG. 19 shows the present embodiment in use on an item 56, in this case a helmet. However, the reader will appreciate that the same benefits can be achieved by using the device 30 on other items, such as backpacks. Item 56 includes device 30 which is comprised of female member 33 and male member 32 with internal components, electrical circuitry and components thereof (not shown), camera 80 and speaker 84. Line A represents strip 86 which is a part of device 30 and connects camera 80 and speaker 84 to female and male member 33, 32, such that an electrical event can occur when members 32, 33 are joined together. This use would be especially beneficial where a child leaving school to bike home (or walk where the device 30 is on a backpack). Once child connects female member 33 and male member 32 together, an electrical event would occur, activating microcontroller (not shown) located within female member 33. Microcontroller (not shown) and other component parts would act to send a signal to a mobile device (as shown in FIG. 19). A parent using mobile device would receive a notification from mobile application letting the parent know that the child had activated the device 30. The parent could use the mobile application to access the camera 80 or microphone 88 during the child's trip home. Additionally, other component parts could be used—as an example, a parent could utilize a GPS unit in connection with device 30 to locate the position of the child on their way home from school. The reader will appreciate that this is one manner among many that device 30 could be utilized on an item 56.

The reader will appreciate that, as an alternative to the above discussed circuitry, an integrated chip or circuit 150 may be present in the alternative to microcontroller 72, rather than in addition to it. In that embodiment, it is integrated chip 150 that is triggered by the closure of the described circuit, triggering a signal which will be sent to a communication device. For example, the device may simply, upon closure of the buckle and thus the circuit, send a signal to a smart phone, triggering a visual notification to the user that the buckle has been closed.

The reader will appreciate that the present device 30 can be applied to any type of item that can incorporate a side buckle release device 30. Some examples include safety items, such as helmets, life preserving vests, car seats, safety or construction vests and practical fashion items, such as fanny packs, belts, backpacks, luggage, shoulder bags, jackets and pet collars. Several items require waterproofing material and therefore the side buckle release device 30 should be securely waterproof. A safety helmet is shown as item 56 in FIG. 19. The present invention should not be limited to powering the above-described items. It should be known that other electrical components could be powered by device, such as a heating element.

Further, a USB charging port can be integrated into the design to allow the use of a rechargeable battery 130. The user could easily plug the device into an external power source for charging purposes.

The preceding description contains significant detail regarding the novel aspects of the present invention. It should not be construed, however, as limiting the scope of the invention but rather as providing illustrations of the preferred embodiments of the invention. As an example, the electrical circuit 58, 59 can be configured to provide power through one switch or two switches. Additionally, the battery 130 and resistor 110 could be housed in the male member 32 as opposed to the female member 33. Thus, the scope of the invention should be fixed by the following claims, rather than by the examples given.

Having described my invention, I claim:

1. A side buckle release device for communicating with a mobile device having a mobile application, comprising:
    a female member, having a housing and a first catch assembly, wherein said housing is connected to said first catch assembly;
    a male member configured to interlock with said female member, wherein said male member has a second catch assembly connected to an arm assembly;
    wherein said arm assembly of said male member comprises at least two spring arms each having a retaining block;
    an electrical circuit traversing said female member and said male member,
    wherein said electrical circuit has:
        a series of wires,
        a source of electrical energy,
        a first switch,
        a second switch;
        wherein said first switch and said second switch are closed when said male member fully engages with said female member;

at least one electrical element; and wherein one of said at least one electrical element is at least one microcontroller which activates upon closure of said first switch and said second switch to allow communication with a mobile device.

2. The side buckle release device of claim 1, wherein said at least one microcontroller has a RF transceiver, wherein said side buckle release device is capable of pairing with another communication device.

3. The side buckle release device of claim 1, wherein said side buckle release device further comprises an external camera, wherein said at least one microcontroller triggers activation of said external camera.

4. The side buckle release device of claim 3, wherein said activation of said microcontroller triggers the activation of said mobile application on a mobile device, wherein live footage from said external camera is viewable on said mobile application.

5. The side buckle release device of claim 1, wherein said at least one microcontroller has wireless networking enablement, wherein said side buckle release device is capable of connecting with said mobile device.

6. The side buckle release device of claim 1, wherein said electrical circuit further comprises a global positioning system unit, wherein said global positioning system unit is activated upon closure of said first switch and said second switch.

7. The side buckle release device of claim 1, wherein said electrical circuit further comprises a speaker, wherein said speaker is capable of making an audible sound upon closure of said electrical circuit.

8. The side buckle release device of claim 1, wherein said source of electrical energy is a battery.

9. The side buckle release device of claim 1, wherein said electrical circuit further comprises a current limiting resistor fully housed within said housing of said female member.

10. A side buckle release device for communicating with a mobile device having a mobile application, comprising:

a female member, having a housing and a first catch assembly, wherein said housing is connected to said first catch assembly;

a male member configured to interlock with said female member, wherein said male member has a second catch assembly connected to an arm assembly;

wherein said arm assembly of said male member comprises at least two spring arms each having a retaining block;

an electrical circuit traversing said female member and said male member, wherein said electrical circuit has:

a series of wires, a source of electrical energy, a first switch, a second switch;

wherein said first switch and said second switch are closed when said male member fully engages with said female member;

a plurality of electrical elements; and wherein said plurality of electrical elements includes at least one integrated circuit chip capable of sending a signal to said mobile device to activate connection between said side release buckle device and said mobile device upon closure of said first switch and said second switch.

11. The side buckle release device of claim 10, wherein said plurality of electrical elements comprises said at least one integrated circuit chip, a camera and a microphone.

12. The side buckle release device of claim 10, further comprising a strip extending between said female member and male member, which includes said series of wires and is capable of accepting said plurality of electrical elements.

13. The side buckle release device of claim 10, wherein said plurality of electrical elements comprises said at least one integrated circuit chip, a camera, a microphone and a global positioning system unit.

14. The side buckle release device of claim 10, wherein said plurality of electrical elements can be controlled using said mobile application on said mobile device when in a connected state to said side buckle release device.

15. The side buckle release device of claim 10, further comprising an external camera, wherein said activation of said integrated circuit chip sends a signal to pair said external camera to said mobile device, triggering a streaming video of said camera on said mobile device.

16. The side buckle release device of claim 10, wherein said plurality of electrical elements comprises a global position system unit, wherein said global positioning system unit is activated upon closure of said first switch and said second switch.

17. The side buckle release device of claim 10, wherein said plurality of electrical elements comprises a RF transceiver, wherein said side buckle release device can be paired with said mobile device.

18. The side buckle release device of claim 10, wherein said plurality of electrical elements comprises a wireless networking enablement, wherein said connection between said side buckle release device and said mobile device is through said wireless networking enablement.

* * * * *